United States Patent [19]

Kikuta et al.

[11] Patent Number: 4,909,080
[45] Date of Patent: Mar. 20, 1990

[54] ULTRASONIC LEVEL GAUGE

[75] Inventors: Mitsuhiro Kikuta, Nagoya; Toshinori Takahashi, Bisai; Tatsuya Terayama, Tsushima; Kimiko Hasegawa, Aichi; Chikahisa Hayashi, Anjo, all of Japan

[73] Assignee: Toyoda Gosei Co., Ltd., Nishikasugai, Japan

[21] Appl. No.: 237,061

[22] Filed: Aug. 29, 1988

[30] Foreign Application Priority Data

Oct. 31, 1987 [JP] Japan .......................... 62-167187[U]
Oct. 31, 1987 [JP] Japan .......................... 62-167188[U]

[51] Int. Cl.$^4$ ........................................... G01F 23/28
[52] U.S. Cl. .................................. 73/290 V; 340/621; 367/908
[58] Field of Search .................. 73/290 V; 331/241; 367/908; 340/621

[56] References Cited

U.S. PATENT DOCUMENTS

| | | | |
|---|---|---|---|
| 3,017,771 | 1/1962 | Bonhomme | 73/290 V |
| 3,208,281 | 9/1965 | Kalmus et al. | 73/290 V |
| 3,222,929 | 12/1965 | Kalmus et al. | 73/290 V |
| 4,090,407 | 5/1978 | Shuler et al. | 73/290 V |
| 4,545,245 | 10/1985 | Sharp | 73/290 V |
| 4,679,430 | 7/1987 | Scott-Kestin | 73/290 V |

FOREIGN PATENT DOCUMENTS

2431903 1/1976 Fed. Rep. of Germany ...... 333/241

Primary Examiner—Daniel M. Yasich
Attorney, Agent, or Firm—Cushman, Darby & Cushman

[57] ABSTRACT

An ultrasonic level gauge that measures the level of a test surface inside a tank. A guiding pipe guides the ultrasonic wave transmitted by an ultrasonic transceiver to the test surface, and guides the ultrasonic wave reflected by the test surface back to the ultrasonic transceiver. An extended portion that extends the propagation distance of the ultrasonic wave guided by the guiding pipe may be provided on the basal portion of the guiding pipe. In this case, the ultrasonic transceiver is provided at the opening at the end of the extended portion. Also, a helical portion or a slanting portion may be provided in the guiding pipe to make the ultrasonic wave transmitted by the ultrasonic transceiver enter the test surface in a slanting direction.

7 Claims, 6 Drawing Sheets

ULTRASONIC LEVEL GAUGE

FIELD OF THE INVENTION

The present invention relates to an ultrasonic level gauge used in measuring the level of a test surface by utilizing ultrasonic waves.

DESCRIPTION OF THE RELATED ART

In this type of level gauge, for example, a pulse modulated ultrasonic wave is transmitted from an ultrasonic transceiver to a test liquid surface, and the ultrasonic wave reflected by the same liquid surface is received by the same ultrasonic transceiver. The transmission and reception of the ultrasonic wave is performed by time division switching. The time required for the ultrasonic wave transmitted by the ultrasonic transceiver to reach the transceiver after it has been reflected by the test liquid surface is measured, then the distance between the ultrasonic transceiver and the test liquid surface is calculated, giving a measurement of the level of the test liquid surface.

However, in the level gauge mentioned above, since the transmission and reception of the ultrasonic wave from the ultrasonic transceiver is performed by time division switching, when the test liquid surface is too near the ultrasonic transceiver, transmission and reception of the ultrasonic wave by time division switching becomes difficult, and it becomes impossible to measure the liquid level.

SUMMARY OF THE INVENTION

An object of the present invention is to provide an ultrasonic level gauge that can measure the level of a test surface even when the distance between the test surface and the ultrasonic transceiver is very small.

One other object of the present invention is to provide an ultrasonic level gauge which does not require extra space for disposing an extended portion.

One other object of the present invention is to provide an ultrasonic level gauge which can detect the change of even a slight displacement of the level of the test surface, and thus can improve the precision in measuring the level of the test surface.

One other object of the present invention is to provide an ultrasonic level gauge which can prevent measurement error due to the ultrasonic waves reflected by surfaces other than the test surface.

One other object of the present invention is to provide an ultrasonic level gauge which cuts off any signals other than the ultrasonic wave reflected by the test surface, such as noise signals coming from the outside, and thus can prevent measurement error due to these noise signals.

One other object of the present invention is to provide an ultrasonic level gauge which can minimize the displacement of the test surface even when the liquid is shaken, as in a liquid provided inside a car, while the car is moving, and thus can minimize the measurement error of the liquid level of the test surface.

To realize the objects mentioned above, the ultrasonic level gauge of the present invention comprises a transceiver which transmits and receives an ultrasonic wave; a guiding pipe having a basal portion and a tip portion extending from the basal portion to the test surface, this guiding pipe guiding the ultrasonic wave transmitted from the ultrasonic transceiver to the test surface, and guiding the ultrasonic wave reflected from the test surface back to the ultrasonic transceiver; and an extended portion extending from the basal portion of the guiding pipe and having a tip portion, this extended portion extending the propagation distance of the ultrasonic wave guided by the guiding pipe, the ultrasonic transceiver being provided at the end of this extended portion.

Other objects of the present invention will become clear with an understanding of the embodiments described later, and as specified in the appended claims. Further, many advantages not mentioned in this specification will become obvious to one skilled in the art upon application of the present invention.

DESCRIPTION OF THE PREFERRED EMBODIMENTS

The first embodiment, a realization of the present invention, is described in detail with reference to FIG. 1 to FIG. 6.

Figure 1:
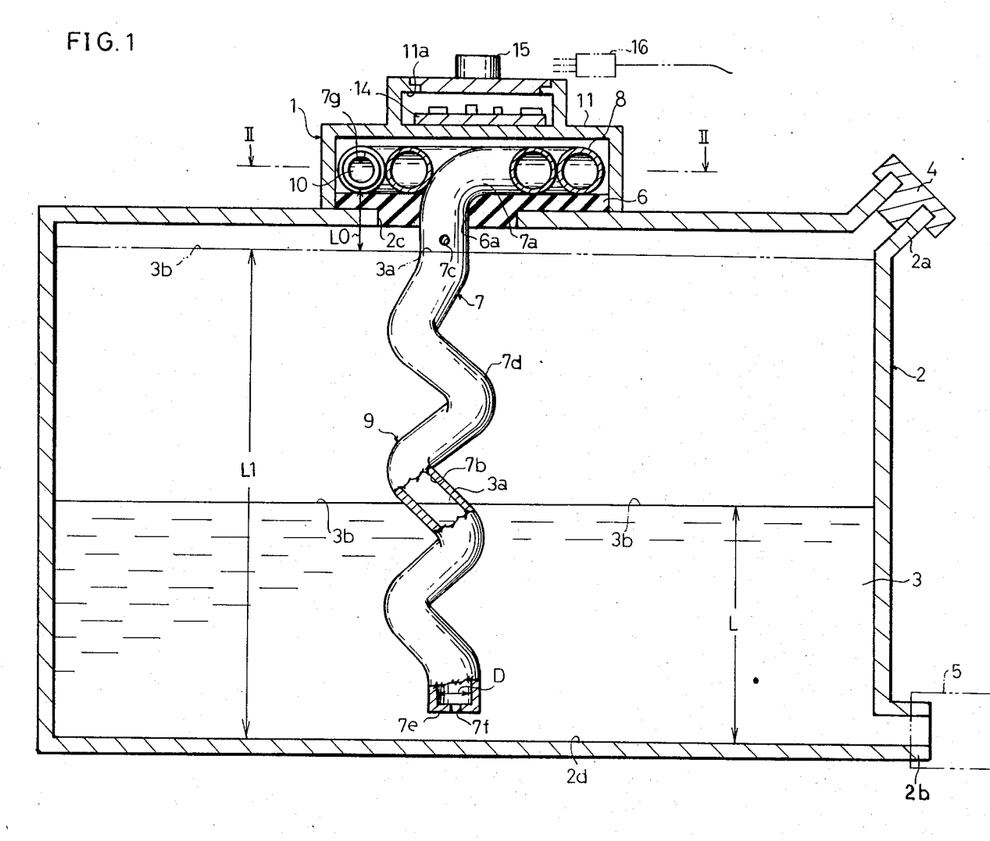
FIG. 1 is a partial broken front view showing the level gauge as set up inside a tank.

As shown in FIG. 1, an ultrasonic level gauge 1 of the present embodiment is constructed to measure the liquid level L of a liquid 3 stored inside a tank 2.

A supply opening 2a for supplying a liquid is formed on the upper part of a side of the tank 2. A removable cap 4 is attached to the same supply opening 2a. Also, an outlet 2b for discharging the liquid to the outside is formed on a lower portion of the tank 2. An end of an outlet pipe 5 is connected to the same outlet 2b. Further, the liquid 3 inside the tank 2 is sent to a prescribed liquid processing apparatus (not shown) by means of the outlet pipe 5, the liquid being appropriatedly consumed by this apparatus. Thus, as the liquid 3 is consumed, the liquid level L inside the tank 2 becomes lower. An opening 2c is also formed on the central part of the upper portion of the tank 2.

The level gauge 1 is provided with a cap 6 fitted to the opening 2c. A perforation 6a is formed in the central portion of this cap 6, with the guiding pipe 7 passing through this perforation 6a on the cap 6, and fixed to it. An extended portion 8 of the guiding pipe 7 is provided at its basal portion 7a as an extension of its length, and formed by winding the extension in the shape of a spiral, covering an area in the horizontal direction. This extended portion 8 is supported outside the tank 2 by the top surface of the cap 6. Also, in the interior portion of the tank 2, an air hole 7c, for letting air into the pipe interior 7b, is formed on the outer wall of the basal portion 7a of the guiding pipe.

On the other hand, the tip portion 7d of the guiding pipe 7 inserted inside the tank 2 is a helical portion 9, so called because it is formed in a helical shape with a fixed pitch. Also, the tip portion 7d of the guiding pipe 7 is formed with a bottom wall. A small hole 7f, that allows passage into the pipe interior 7b, is formed at the bottom wall 7e of the tip portion 7d. By inserting the tip portion 7d of the guiding pipe 7 into the tank 2 containing the liquid 3, the liquid 3 is introduced into the pipe interior 7b through the small hole 7f. Further, the liquid surface 3a of the liquid introduced into the pipe interior 7b is of the same level as the remaining liquid surface 3b; this liquid surface 3a then becomes the test liquid surface. The level of this liquid surface 3a inside the pipe interior 7b changes with the increase or decrease of the liquid 3.

Figure 2:
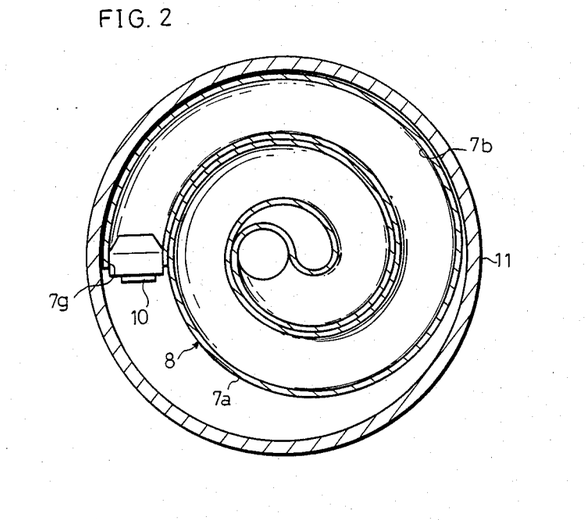
FIG. 2 is a sectional view along the line II—II of FIG. 1.

Further, as shown in FIG. 1 and FIG. 2, an ultrasonic transceiver 10 comprising piezoelectric elements is provided inside the pipe interior 7b, and is fitted to the opening 7g of the basal portion 7a of the guiding pipe 7. The ultrasonic wave transmitted by the ultrasonic transceiver 10 is guided through the guiding pipe 7 to the liquid surface 3a, then the ultrasonic wave reflected by the liquid surface 3a is guided back to the transceiver 10 through the guiding pipe 7, finally being received by the same transceiver 10.

As materials for the guiding pipe 7, rubber or synthetic resins such as vinyl chloride, polyamide, polyacetal, and others can be used; metals such as stainless steel, aluminum, and brass can also be used.

Figure 6:
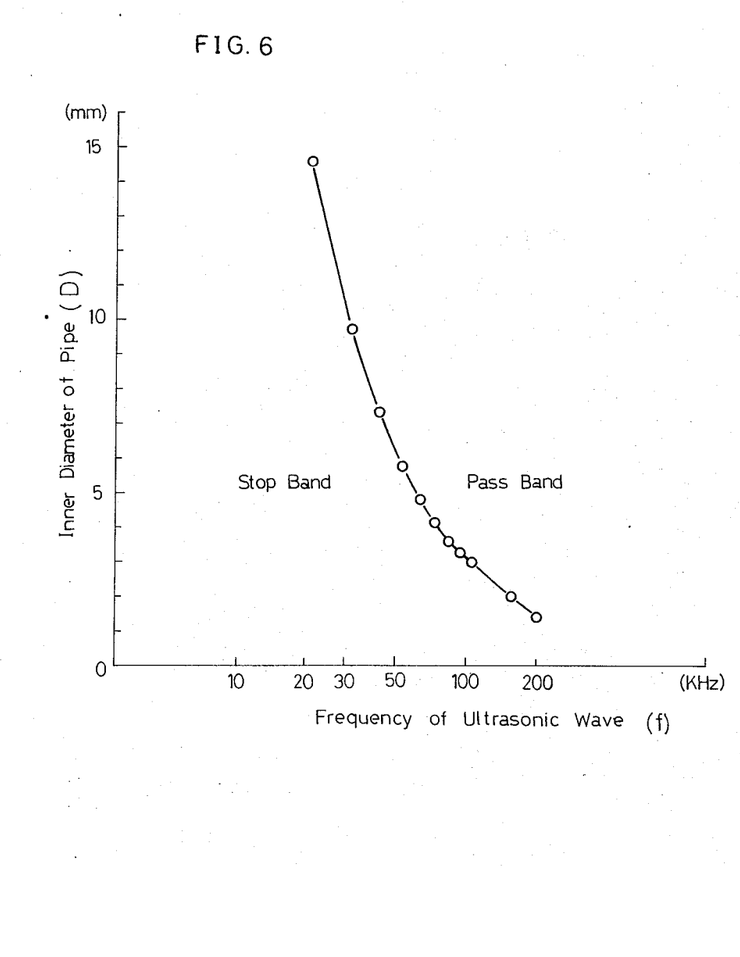
FIG. 6 is a graph showing the relationship between the inner diameter of the pipe and the ultrasonic wave frequency.

The inner diameter D of the guiding pipe 7 is determined by the frequency of the ultrasonic wave passing through the pipe interior 7b. In other words, as shown in FIG. 6, the tendency is that, as the frequency f of the ultrasonic wave passing through the pipe interior becomes higher, the inner diameter of the pipe that allows the higher ultrasonic frequency to pass becomes smaller. In FIG. 6, the region on the left side of the graph represents the stop band, in which ultrasonic waves cannot pass through the pipe interior, and the region on the right side of the same graph is the pass band, in which ultrasonic waves can pass through the pipe interior. Based on this relationship between the inner diameter D of the pipe and the frequency f of the ultrasonic wave in the guiding pipe 7 of the embodiment, the ultrasonic wave frequency f is fixed at 40 kHz and the inner diameter D of the pipe is fixed at 7–8 mm.

The extended portion 8 of the guiding pipe 7 is covered by a case 11 fitted to the cap 6. Also, a small room 11a is formed on the upper portion of the same case 11.

Figure 4:
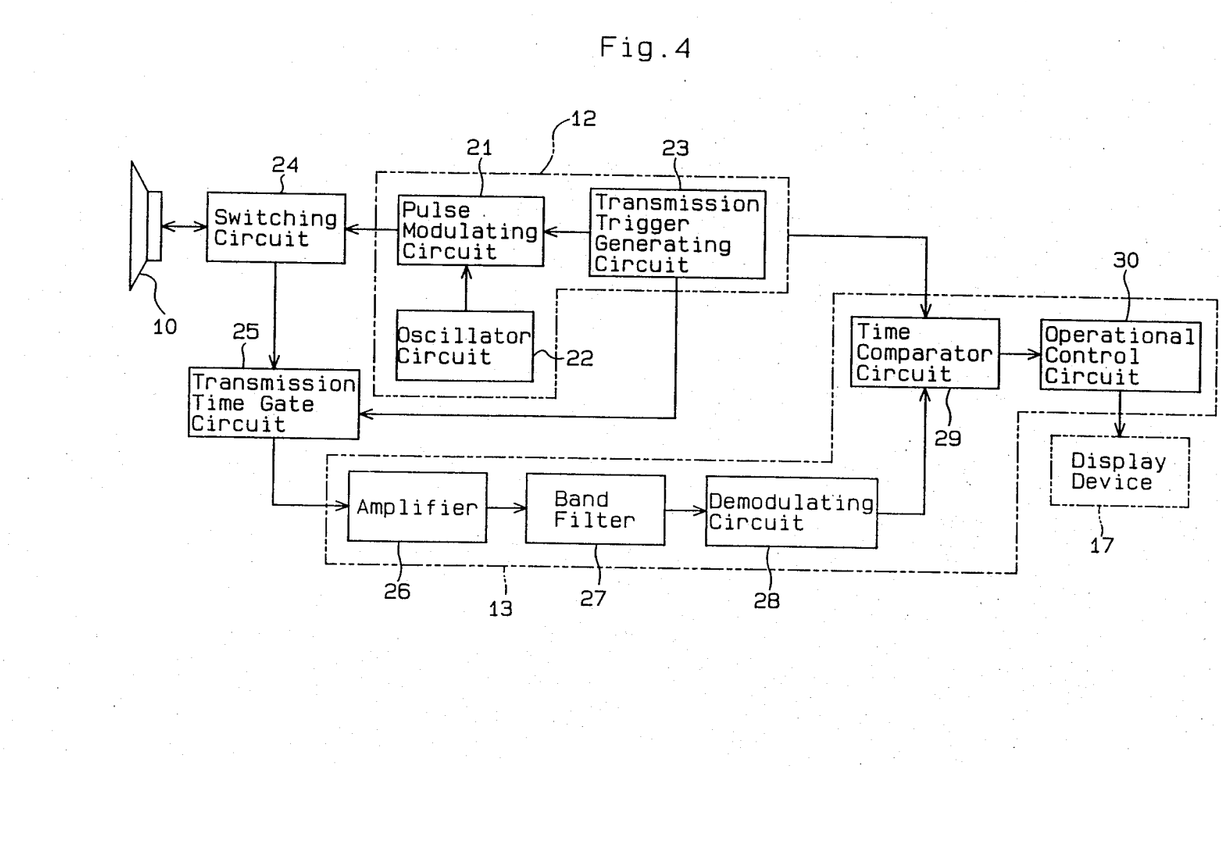
FIG. 4 is a block diagram showing the electrical structure of the level gauge.

As shown in FIG. 4, the level gauge 1 of the present embodiment is integrally furnished with an ultrasonic oscillator 12 that outputs a signal to the ultrasonic transceiver 10 to make it generate an ultrasonic wave at a prescribed frequency, and a signal processing apparatus 13 that processes the ultrasonic wave received by the ultrasonic transceiver 10. A circuit board 14, furnished with the electronic circuits containing both of the devices 12, 13, is disposed inside the small room 11a inside the case 11.

Further, a connector 15 is provided on the top portion of the small room 11a. Another connector 16 is connected to this same connector 15. Finally, this outer connector 16 is connected to a display device 17 that displays the liquid level L.

Figure 5:
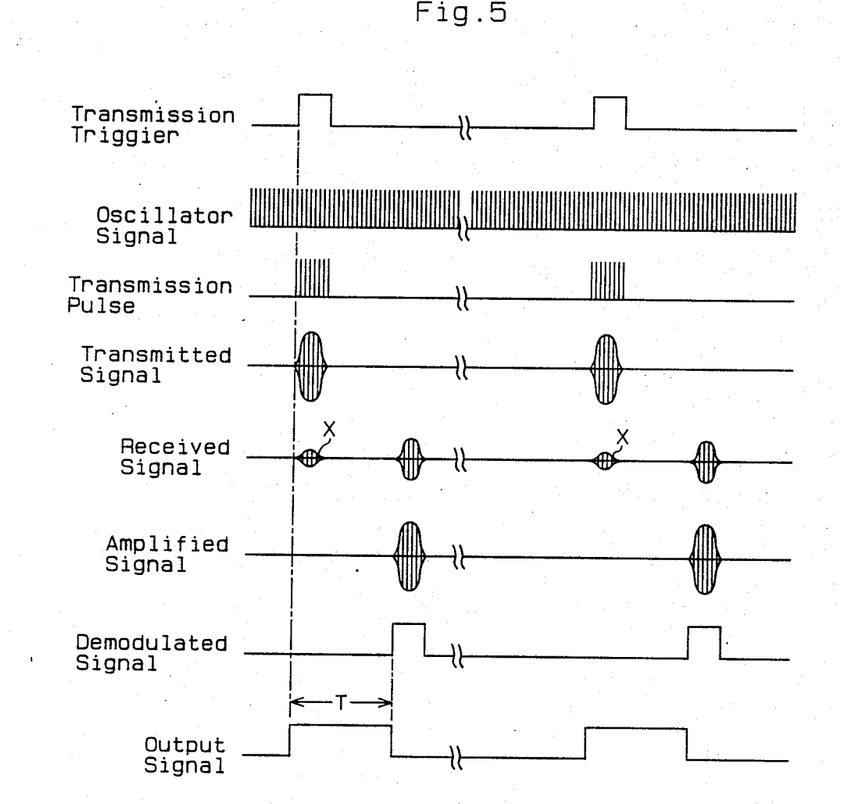
FIG. 5 is a time chart showing various signals.

Next, the electrical structure of the level gauge 1 is explained with reference to FIG. 4 and FIG. 5.

As shown in FIG. 4, the ultrasonic oscillator 12 is provided with a pulse modulating circuit 21. An oscillator circuit 22 that generates a prescribed oscillator signal, and a transmission trigger generating circuit 23 that generates a transmission trigger at a prescribed period are connected to the pulse modulating circuit 21. The oscillator signal and the transmission trigger from both circuits 22, 23, respectively, are inputted into the pulse modulating circuit 21. In response to these inputs, the modulating circuit 21 outputs a modulated transmission pulse synchronous with the transmission trigger.

The pulse modulating circuit 21 is connected to the ultrasonic transceiver 10 via a switching circuit 24, and the transmission pulse from the pulse modulating circuit 21 is inputted into the ultrasonic transceiver through this switching circuit 24. In response to this transmission pulse, the ultrasonic transceiver 10 transmits a (transmitted) signal in the form of an ultrasonic wave.

The switching circuit 24 is connected to the signal processing circuit 13 via a transmission time gate circuit 25, and the signal in the form of an ultrasonic wave received by the ultrasonic transceiver 10 is inputted into the signal processing apparatus 13 through this transmission time gate circuit 25. Also, the transmission time gate circuit 25 is connected to the transmission trigger generating circuit 23, and also takes the transmission trigger as input. The transmission time gate circuit 25 is such that it does not output a signal to the signal processing apparatus only when the transmission trigger is being inputted. Thus, the signal received by the ultrasonic transceiver 10 is the only signal that is inputted into the signal processing apparatus 13; the leakage transmission signal X arising from the transmission of the (transmitted) signal is not inputted into the signal processing apparatus 13.

The signal processing apparatus 13 is provided with an amplifier 26 that inputs the received signal from the transmission time gate circuit 25. This amplifier 26 is connected to a demodulating circuit 28 via a band filter 27. The demodulating circuit 28 is further connected to a time comparator circuit 29. Finally, this comparator circuit 29 is connected to an operational control circuit 30. The received signal inputted from the transmission time gate circuit 25 into the amplifier 26 is amplified by this same amplifier 26. The amplified signal passes through the band filter 27, after which only the resonant frequency components are again inputted into the demodulating circuit 28. The demodulating circuit 28 generates and inputs into the time comparator circuit 29 a demodulated signal which is a trigger pulse synchronous with the input timing from the band filter 27.

Further, the time comparator circuit 29 is connected to the transmission trigger generating circuit 23, with the transmission trigger from the same generating circuit 23 being inputted into the time comparator circuit 29. Then, between the interval of the rise of the transmission trigger and the rise of the demodulated signal, the time comparator circuit 29 generates a high level output signal, and inputs it into the operational control circuit 30. The operational control circuit 30 then measures the period of duration T of the high level output signal, and calculates the distance between the ultrasonic transceiver 10 and the liquid surface 3a based on this period of duration T.

In the operational control circuit 30, the length of the extended portion 8 of the guiding pipe 7 is subtracted from the distance between the transceiver 10 and the liquid surface 3a calculated using the period of duration T. Then, the distance between the ultrasonic transceiver 10 and the bottom surface 2d of the tank is also calculated, taking into consideration the correction, proportional to the pitch of the helical portion 9, due to the upward and downward displacement of the liquid surface 3a. From this distance, the result of the previous calculation involving the extended portion 8 is subtracted, giving the liquid level L as the output of the operational control circuit 30.

A display device 17 is further connected to the operational control circuit 30. The signal resulting from the operations in the operational control circuit 30 is inputted into this display device 17 which displays the value of the liquid level L in digitized form.

In order to supply the respective circuits 21-30 with an operating voltage, a power supply line (not shown), that supplies a fixed voltage, is connected to the circuit board 14.

Next, the operation of the level gauge 1 having the construction described above is explained.

Referring to the condition shown in FIG. 1, when electricity is supplied to the circuit board 14, the transmission pulse output from the ultrasonic oscillator is received by the ultrasonic transceiver via the switching circuit 24, and a (transmitted) signal is transmitted by the same ultrasonic transceiver 10. This transmitted signal is guided through the guiding pipe 7 to the liquid surface 3a, then reflected back by the same liquid surface 3a. Further, the ultrasonic wave reflected by the liquid surface 3a is again guided through the guiding pipe 7 back to and received by the ultrasonic transceiver 10.

In response to the ultrasonic wave received, the ultrasonic transceiver 10 outputs a received signal to the transmission time gate circuit 25 via the switching circuit 24. Since at the output timing of the received signal, the transmission time gate circuit 25 is in a state where it can output a signal to the signal processing apparatus 13, the received signal is inputted into the signal processing apparatus 13.

In the signal processing apparatus 13, the period of duration T from the input time of the transmission trigger from the transmission trigger generating circuit 23, which is coincident with the generation of the transmitted signal, to the input time of the received signal is measured. The liquid level L is calculated using this period of duration T. Then, the liquid level L, which is the result of the processing, is displayed in digitized form by the display device 17.

In this embodiment, since the basal portion 7a of the guiding pipe 7 is provided with an extended portion 8, when the liquid 3 inside the tank 2 is at a nearly full level as shown by the 2-dot chain lines in FIG. 1, the liquid surfaces 3a, 3b, and the ultrasonic transceiver 10 become near each other. Even when the distance LO between the liquid surfaces 3a, 3b and the ultrasonic transceiver 10 is small; however, a time interval based on time division, between the transmission of an ultrasonic wave from the ultrasonic transceiver 10 and its subsequent reception can be sufficiently maintained. In other words, since the ultrasonic wave is guided along the extended portion 8 during its round trip between the ultrasonic transceiver 10 and the liquid surface 3a, its propagation distance is extended by the extended portion 8. Therefore, the time interval between the transmission of the ultrasonic wave from the ultrasonic transceiver and its reception is extended. As a result, even for a case where the distance LO between the ultrasonic transceiver 10 and the liquid surfaces 3a, 3b is substantially small, the liquid level L can be measured. Further, since the extended portion 8 is wound in the form of a spiral, the space it occupies can be minimized.

Figure 3:
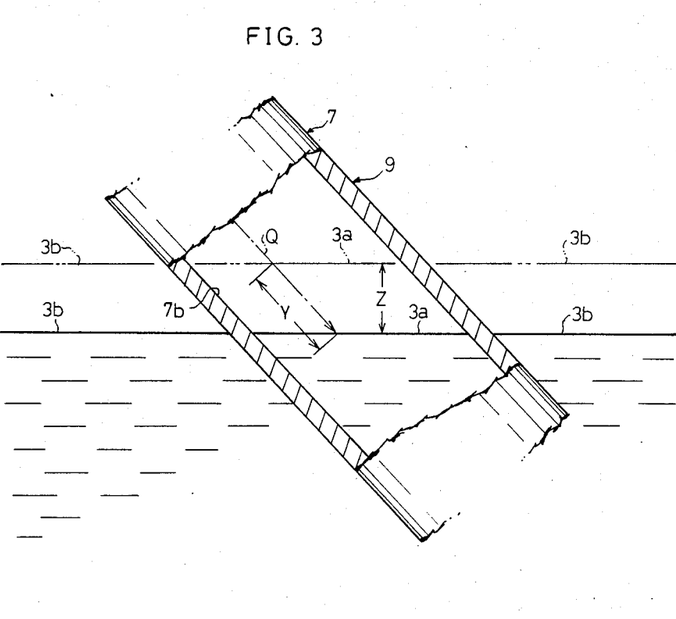
FIG. 3 is a partial front view showing a guiding pipe.

On the other hand, in this embodiment, since the tip portion 7d of the guiding pipe 7 is provided with a helical portion 9, even if the liquid surfaces 3a, 3b are slightly displaced upward and downward, this displacement can be measured. In other words, as shown in FIG. 3, in a part within the helical portion 9 of the guiding pipe 7, the ultrasonic wave Q enters the liquid surface 3a in a substantially slanting direction. Therefore, for example, when the liquid surfaces 3a, 3b are slightly displaced by an amount Z from the position shown by the 2-dot chain line to the position shown by the solid line in FIG. 3, a one way propagation distance of the ultrasonic wave Q differs only by a distance Y proportional to the displacement Z. In this case, the difference Y of the propagation distance of the ultrasonic wave Q is always bigger than the displacement of the liquid surface 3a. Therefore, the displacement of the liquid surface 3a is measured as a substantially magnified amount, resulting in an improvement in the accuracy of measuring any of the liquid levels L, L1.

Further, in this embodiment, since the transmitted signal is continuously generated at a prescribed period corresponding to the transmission trigger of the transmission trigger generating circuit 23, by performing the transmission and reception of the ultrasonic wave at each period, even when the liquid surface 3a is continuously changing, any of the liquid levels L, L1 can be continuously measured.

Further, in this embodiment, since the ultrasonic wave making a round trip between the ultrasonic transceiver 10 and the liquid surface 3a is guided by the guiding pipe 7, reflection of the ultrasonic wave by any of the inner walls of the tank 2 does not occur. As a result, any measurement error due to the reflection by the inner walls of the tank 2, other than the liquid surface 3a, can be prevented.

Also, through the guiding pipe 7, aside from the ultrasonic wave reflected by the liquid surface 3a, any signal from the outside like noise signals can be cut off, preventing any measurement error due to these external noise signals.

Further, in the level gauge 1 of this embodiment, the test surface is limited to the area of the liquid surface 3a inside the guiding pipe 7. For this reason, for example, when the level gauge 1 is applied to a tank provided in a vehicle such as a car, or others, and used to measure the liquid level of the liquid inside the tank, the displacement of the test surface can be minimized even when the liquid is shaken due to the movement of the car. Therefore, the measurement error of the liquid level of the test surface can be minimized.

Figure 7:
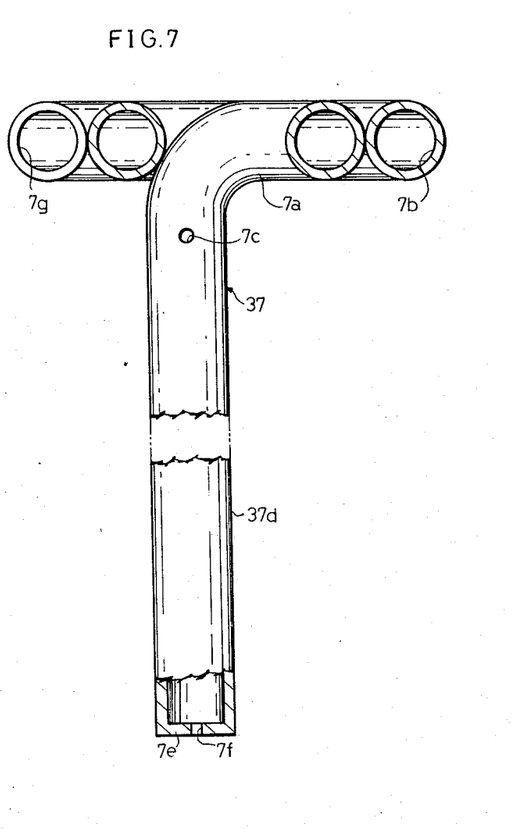
FIG. 7 is a partial broken front view showing a modification of the guiding pipe.
Figure 8:
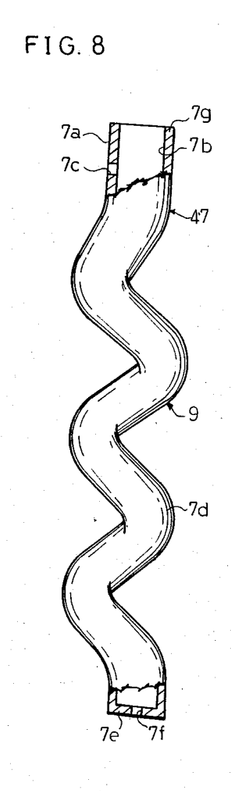
FIG. 8 is a partial broken front view showing another modification of the guiding pipe.
Figure 9:
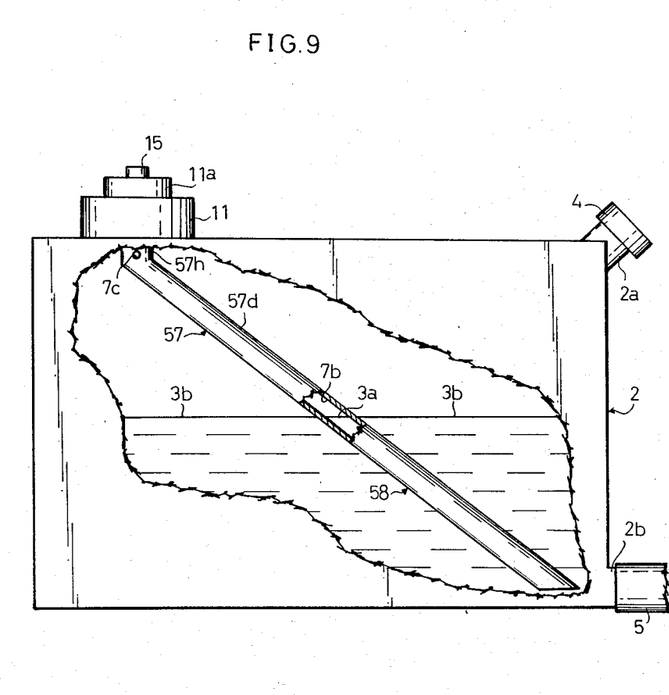
FIG. 9 is a partial broken front view showing the set up of another example of a level gauge.

This invention is not limited to the embodiment just described; for example, it can also be constructed according to the following description. As shown in FIG. 7, instead of using the helical portion 9, a guiding pipe 37 having its tip portion 37d formed in a straight line can be applied. Aside from the spiral form, the extended portion can be constructed in any configuration. The bottom wall 7e can be omitted, and a guiding pipe 7 without a covered bottom can be used. Aside from the liquid 3, the level gauge can be applied in measuring the level of the surface of powdered substances. As shown in FIG. 8, a guiding pipe 47 without the extended portion 8 can be used. As shown in FIG. 9, the tip portion 57d of the guiding pipe 57 can be shaped in a straight line, and disposed such that it crosses the liquid surfaces 3a, 3b in a slanting direction, providing a slanted portion 58, which serves as a wave incidence means intersecting the connection 57h of the basal portion 7a and the tip portion 57d.

Inasmuch as it is clear that the present invention can be constructed and applied in a wide range of realizations without departing from its spirit and scope, the embodiments of the present invention are not limited to specific embodiments except as defined in the appended claims.

What is claimed is:

1. An ultrasonic level gauge for immersion in a liquid in a tank and to measure a level of liquid surface thereof, comprising:
    an ultrasonic transceiver that transmits and receives an ultrasonic wave,
    a hollow guiding pipe having a basal portion, a tip portion extending from said basal portion to said liquid surface and adapted to be immersed in said liquid in said tank, and a hole formed in said tip portion to introduce said liquid into an interior of said guiding pipe therethrough, the ultrasonic wave transmitted by said ultrasonic transceiver to said liquid surface being guided along said interior of said guiding pipe, reflected by said liquid surface, and also guided along said interior of said guiding pipe to said ultrasonic transceiver, and
    an extended portion provided on said basal portion of said guiding pipe, positioned above said liquid surface, and formed in a curved shape having an end situated away from said tip portion, said ultrasonic transceiver being provided at said end of said extended portion.

2. An ultrasonic level gauge as set forth in claim 1, in which said extended portion is formed in the shape of a spiral.

3. An ultrasonic level gauge as set forth in claim 1, in which said tip portion of said guiding pipe is formed in a straight line.

4. An ultrasonic level gauge comprising
    an ultrasonic transceiver that transmits and receives an ultrasonic wave,
    a guiding pipe adapted to be immersed in a liquid and having a basal portion supporting said ultrasonic transceiver, and a tip portion extending from said basal portion to a test surface of which a level is to be gauged, said guiding pipe guiding the ultrasonic wave transmitted by said ultrasonic transceiver to said test surface, and also guiding the ultrasonic wave reflected by said test surface to said ultrasonic transceiver to gauge its level, and
    a wave incidence means provided on said tip portion of said guiding pipe such that it crosses said test surface in a slanting direction, making said ultrasonic wave transmitted from said ultrasonic transceiver enter said test surface in a slanting direction.

5. An ultrasonic level gauge as set forth in claim 4, in which said wave incidence means comprises a helical portion formed by shaping said tip portion of said guiding pipe in a helical configuration with a fixed pitch.

6. An ultrasonic level gauge as set forth in claim 4, in which said wave incidence means comprises a slanting portion intersecting and extending from the connection of said basal portion and tip portion of said guiding pipe.

7. An ultrasonic level gauge comprising
    an ultrasonic transceiver that transmits and receives an ultrasonic wave,
    a guiding pipe having a basal portion and a tip portion extending from said basal portion to a test surface of which a level is to be gauged, said guiding pipe guiding the ultrasonic wave transmitted from said ultrasonic transceiver to said test surface, and also guiding the ultrasonic wave reflected by said test surface to said ultrasonic transceiver to gauge its level,
    an extended portion having a tip portion extending from said basal portion of said guiding pipe, said extended portion extending the propagation distance of the ultrasonic wave guided by said guiding pipe, said ultrasonic transceiver being provided on said tip portion of said extended portion, and
    a wave incidence means provided on said tip portion of said guiding pipe, crossing said test surface in a slanting direction with respect to said test surface, and making the ultrasonic wave transmitted from said ultrasonic transceiver enter said test surface in said slanting direction.

* * * * *